United States Patent [19]

Clark et al.

[11] 4,174,279

[45] Nov. 13, 1979

[54] MINERAL FILLERS

[75] Inventors: Norman O. Clark; Thomas R. Jones, both of Cornwall, England

[73] Assignee: English Clays Lovering Pochin & Co. Ltd., St. Austell, England

[21] Appl. No.: 891,197

[22] Filed: Mar. 29, 1978

[30] Foreign Application Priority Data

Apr. 14, 1977 [GB] United Kingdom ............... 15668/77

[51] Int. Cl.$^2$ ............................................. B01D 21/01
[52] U.S. Cl. ........................................ 210/54; 106/72; 106/288 B; 209/5
[58] Field of Search .................. 106/72, 288 B; 209/5; 210/42 R, 51-54

[56] References Cited

U.S. PATENT DOCUMENTS

| | | | |
|---|---|---|---|
| 3,663,461 | 5/1972 | Witt ......................................... | 210/54 |
| 3,738,945 | 6/1973 | Panzer et al. ........................... | 210/54 |
| 3,753,902 | 8/1973 | Stettler .................................... | 210/54 |
| 3,855,299 | 12/1974 | Witt ......................................... | 210/54 |
| 4,076,548 | 2/1978 | Bundy et al. ............................ | 209/5 |

FOREIGN PATENT DOCUMENTS 1240465 7/1971 United Kingdom .

*Primary Examiner*—Charles N. Hart
*Assistant Examiner*—Peter A. Hruskoci
*Attorney, Agent, or Firm*—Weingram & Klauber

[57] ABSTRACT

In a method of dewatering by pressure filtration an aqueous suspension of a clay containing a small proportion of particles having an equivalent spherical diameter smaller than 1 micron, the improvement which comprises treating the aqueous suspension of the clay, prior to dewatering by pressure filtration at a pressure in excess of 150 pounds per square inch, with a water-soluble polyelectrolyte flocculant having a high density of positive charges.

3 Claims, No Drawings

MINERAL FILLERS

BACKGROUND OF THE INVENTION

This invention relates to the dewatering of clays by pressure filtration and more particularly but not exclusively is concerned with the dewatering of aqueous suspensions of white kaolin clays suitable for use as fillers in the manufacture of paper or the like product.

In the manufacture of paper or like product, there is generally incorporated in the fibrous pulp from which the paper or like product is formed a mineral filler the use of which inter alia reduces the cost of the product. One mineral filler which is used for this purpose is white kaolin clay which brings about an improvement in the opacity and printing properties of the paper. However the white kaolin clay fillers conventionally used result in a reduction in the strength of a paper or the like product containing them; and it has recently been proposed that there should be used as the mineral filler for paper or like product a white kaolin clay having a particle size distribution such that the white kaolin clay contains not more than 18% by weight of particles smaller than 2 microns and not more than 15% by weight of particles smaller than 1 micron equivalent spherical diameter. This kaolin clay filler has an unusual particle size distribution in that there are present substantially fewer very small particles as compared with a conventional kaolin clay filler. In the course of preparing such a kaolin clay filler there is formed an aqueous suspension of the kaolin clay filler and it is convenient to complete the preparation of the kaolin clay filler by dewatering the aqueous suspension thereof to reduce the water content of the kaolin clay filler to less than 25% by weight and preferably to less than 20% by weight.

In the dewatering of the aqueous suspension of the kaolin clay filler precautions are taken to prevent as far as possible the formation of fine particles by fracture or shearing of coarser particles. The dewatering is therefore preferably carried out by pressure filtration at a pressure in excess of 150 psig. If a thermal drying step is used subsequent to the pressure filtration step the amount of mechanical work performed on the material in the thermal drying step should be as small as possible and the surface temperature of the material should not be allowed to exceed 120° C. Unfortunately it has been found that in practice it is not possible to eliminate completely from the kaolin clay filler fine particles nor to prevent completely the formation of such fine particles in the dewatering of the aqueous suspension and in other steps in the preparation of the kaolin clay filler.

It is found that when an aqueous suspension of a clay filler (such as the kaolin clay filler described above) which is substantially but not completely free of fine particles is dewatered in a pressure filter the cycle time (i.e. the total time taken for the pressure filter to perform all the operations necessary to form, dewater and discharge a filter cake) increases progressively; and when using a tube pressure filter of the type disclosed in British patent specification No. 1,240,465 the cycle time can increase from about 4 minutes with a new filter cloth to about 15 minutes, at which point the rate of production of filter cake is considered to be unacceptably low. The number of cycles performed in a tube pressure filter before the cycle time rises to this unacceptably high figure varies between about 100 and about 1000 whereas if a tube pressure filter is to be operated economically it is necessary for a filter cloth to remain serviceable for much longer. Similar problems can arise with other types of pressure filter.

It has now been found that the increase in the cycle time is caused by penetration into the inter-filament voids of the filter cloth of fine particles. Although precautions can be taken in the production of a clay filler to keep the amount of fine particles as small as possible, it is not possible to eliminate all fine particles and a few fine particles are inevitably present; and it has been found that these few fine particles are not easily bound to the coarser particles by conventional flocculant (as is the case with a conventional kaolin clay filler have a larger proportion of fine particles) and are therefore free to penetrate the pores of the filter cloth.

SUMMARY OF THE INVENTION

According to the present invention there is provided, in a method of dewatering by pressure filtration an aqueous suspension of a clay having a particle size distribution such that it contains from 1 to 20% by weight of particles having an equivalent spherical diameter smaller than 1 μm, the improvement which comprises treating the aqueous suspension of the clay, prior to dewatering by pressure filtration at a pressure in excess of 150 psig, with a water-soluble polyelectrolyte flocculant having a high density of positive charges.

It is believed that the positive charge density of the water-soluble flocculant, measured in terms of the total number of positive charges per molecule divided by the molecular weight of the flocculant, should preferably be greater than about $1.0 \times 10^{-3}$ and that the molecule should preferably not include any groups having negative charges or negative polarity (e.g. carboxyl or carbonyl groups) which would tend to counteract the positive charges.

The flocculants which are advantageously used in the method of the invention are polyelectrolytes containing quarternary nitrogen atoms in the polymer chain. The preferred flocculants are those obtainable by copolymerising epichlorohydrin and an aliphatic secondary amine, such flocculants having repeating units which can be represented by the formula:

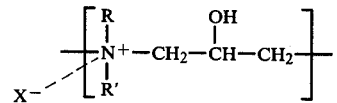

wherein R and $R^1$, which may be the same or different, are each hydrogen, methyl or ethyl and X is Cl, Br, I, $HSO_4$ or $CH_3SO_4$. These copolymers generally have a positive charge density in the range of from $4 \times 10^{-3}$ to $9 \times 10^{-3}$, most usually in the range $6 \times 10^{-3}$ to $8 \times 10^{-3}$. It is believed that with this type of polyelectrolyte flocculant the molecular weight of the flocculant may be important, and copolymers of the above formula having molecular weights (when measured by the Ostwald viscometer method) in the range of from about 50,000 to about 300,000 have been found to be very suitable. The quantity of this type of flocculant required is in the range from 100 to 3000 ppm. (parts by weight of flocculant per million parts of dry clay). Adding more than the stated maximum does can so saturate the clay with positive charges that the clay is once again deflocculated by virtue of the mutual repulsion of the positive charges.

In some circumstances it may be useful to use with the polyelectrolyte flocculant aluminium sulphate, provided that the pH of the aqueous suspension is in the range of from about 5.0 to 5.5. Aluminium sulphate $Al_2(SO_4)_3.18H_2O$, has a positive charge density of $1.0 \times 10^{-3}$.

The method of the present invention is especially useful in the dewatering, by pressure filtration at a pressure in excess of 250 psig, generally in a tube pressure filter of the type disclosed in British Pat. No. 1,240,465, of white kaolin clays having a particle size distribution such that they contain not more than 18% by weight of particles with an equivalent spherical diameter smaller than 2 microns and not more than 15% by weight of particles having an equivalent spherical diameter smaller than 1 micron.

The invention is illustrated by the following Examples.

EXAMPLE 1

An aqueous suspension containing 27% by weight of a kaolin clay which had a particle size distribution such that 9% by weight consisted of particles having an equivalent spherical diameter smaller than 2 μm and 5% by weight consisted of particles having an equivalent spherical diameter smaller than 1 μm, was treated with 1000 ppm, based on the weight of dry kaolin clay, of a 50% by weight solution in water of a polymer having the repeating unit

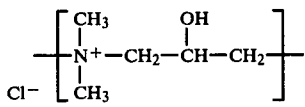

a positive charge density of about $7.3 \times 10^{-3}$, and a molecular weight in the range of from 200,000 to 300,000 in order to flocculate the kaolin clay. The suspension of flocculated clay was fed to a tube pressure filter of the type described in British patent specification No. 1,240,465 and a large number of cycles were performed; the rate of production of filter cake in pounds per hour was measured at intervals. The filter element of the tube pressure filter comprised a 7 oz. per square yard "nylon" filter cloth with a "TERYLENE" felt backing cloth. The pH of the feed suspension remained constant at 4.3 throughout and for approximately the first 2000 cycles the maximum hydraulic fluid pressure was 1500 psig, for the next 4500 cycles the maximum hydraulic fluid pressure was 1100 psig, and for the remaining cycles the maximum hydraulic fluid pressure was again 1500 psig. At the beginning of the sequence of cycles, when the filter cloth was new, the rate of production of filter cake was 410 lb/hr. and it remained substantially at the same level until about 8,300 cycles had been completed, at which point the rate of production began to fall slightly reaching 320 lb/hr. after 11,300 cycles when the run was terminated. As a comparison a run was carried out under the same conditions as above but using no flocculant in the kaolin clay suspension. At the beginning of the run, when the cloth was new, the rate of production of filter cake was 650 lb/hr. but this fell rapidly to 180 lb/hr, in 1000 cycles.

EXAMPLE 2

An aqueous suspension containing 27% by weight of a kaolin clay of the same type as was used in Example 1 was treated with 150 ppm, based on the weight of dry kaolin, of a cationic copolymer obtained by hydrolysing about 10% of the repeating units of a polyacrylamide to acrylic acid and then esterifying the acrylic acid groups with an aliphatic alcohol containing a quaternary ammonium group. The esterified acrylic acid groups had the following structure:

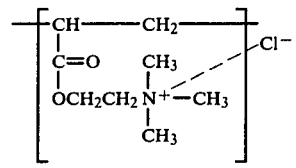

The positive charge density of the copolymer was about $1.2 \times 10^{-3}$ and the molecular weight was about $5 \times 10^6$. The flocculated clay suspension thus obtained was fed to the same tube pressure filter using the same cloths as in Example 1, and the change of rate of production of filter cake with the number of cycles performed was observed. The pH of the feed suspension remained constant at about 3.0 throughout and the maximum hydraulic fluid pressure used was 1500 psig. When the filter cloth was new the rate of production of filter cake was 600 lb/hr. but this fell steadily at first until after 750 cycles the rate of production was 400 lb/hr. The rate of production then remained substantially constant at this level until, after 2,300 cycles, the filter cloth burst possibly because of the consistently low pH requirement.

EXAMPLE 3

An aqueous suspension containing 26% by weight of a kaolin of the same type as was used in Example 1 was treated with sufficient aluminium sulphate to provide 0.6 mg of aluminium per g. of kaolin, sufficient sodium carbonate to raise the pH to 5.5 and 150 ppm, based on the weight of dry kaolin, of the same copolymer as was used in Example 2 in order to flocculate the kaolin.

The flocculated suspension was fed to the same tube pressure filter using the same type of filter cloth as in Example 1, and the change of production of filter cake with the number of cycles performed was observed. The pH of the feed suspension varied between 5.0 and 6.0 and the maximum hydraulic fluid pressure used was 1500 psig. When the filter cloth was new the rate of production of filter cake was 605 lb/hr. but this fell steadily at first until after 1500 cycles the rate of production was 400 lb/hr. The rate of production then remained substantially constant at this level until 2,900 cycles had been completed when the run was terminated.

EXAMPLE 4

A kaolin clay of the same type as was used in Example 1 was formed into an aqueous suspension containing 12% by weight of solids. Samples of this suspension of volume 15.7 ml (i.e. containing 2.0 g of dry kaolin clay) were placed in test tubes and to each test tube there was added a different quantity of the polymeric flocculant described in Example 1. The contents of each test tube were mixed by covering the mouth of the test tube and rapidly inverting the tube several times. The flocculant was added to the test tubes as a solution containing 0.1% by weight of the polymer by a 1 ml pipette graduated in 0.01 ml. After mixing the contents of each test tube were allowed to stand for 30 hours, after which time the volume of flocs was determined for each test tube by measuring the height of the interface between flocs and supernatant liquid above the bottom of the tube. A large volume of flocs indicates the formation of large, strong, open flocs which are most suitable for high-pressure filtration. A visual observation was also made of the clarity of the supernatant liquid. The results obtained are set forth in the following Table.

| Quantity of flocculant added (ppm) | Depth of flocs (mm) | Clarity |
|---|---|---|
| 0 | 23 | Cloudy |
| 50 | 33 | Cloudy |
| 100 | 38 | Slightly cloudy |
| 200 | 42 | Very slightly cloudy |
| 300 | 47 | Very slightly cloudy |
| 400 | 46.5 | Very slightly cloudy |
| 500 | 54 | Clear |
| 600 | 54 | Clear |
| 700 | 56 | Clear |
| 800 | 58 | Clear |
| 900 | 59 | Clear |
| 1000 | 61.5 | Clear |
| 2000 | 59.0 | Clear |
| 3000 | 50 | Very slightly cloudy |
| 5000 | 45 | Cloudy |

In the tube pressure filter it was found that the cloth blinded very quickly when it was attempted to dewater a suspension of kaolin clay containing less than 100 ppm or more than 3000 ppm of the flocculant. Best results were obtained with this flocculant when the quantity used was from 500 to 2500 ppm (parts by weight of flocculant per million parts by weight of dry kaolin clay).

We claim:

1. In a method of dewatering by pressure filtration an aqueous suspension of a kaolin clay having a particle size distribution such that it contains from 1 to 20% by weight of particles having an equivalent spherical diameter smaller than 1 micron, the improvement which comprises treating the aqueous suspension of the clay, prior to dewatering by pressure filtration at a pressure in excess of 150 pounds per square inch, with from 100 to 3000 parts by weight of a water-soluble polyelectrolyte flocculant per million parts by weight of clay, the polyelectrolyte flocculant being a polymer obtainable by copolymerising epichlorohydrin and an aliphatic secondary amine, and essentially consisting of repeating units which can be represented by the formula:

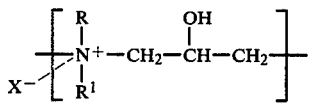

where R and $R^1$ are each selected from the group consisting of hydrogen, methyl and ethyl, and X is selected from the group consisting of Cl, Br, I, $HSO_4$, and $CH_3SO_4$; and said flocculant having a molecular weight (as measured by the Ostwald viscometer method) in the range of from 50,000 to 300,000.

2. A method according to claim 1, wherein the clay is a white kaolin clay which contains not more than 18% by weight of particles smaller than 2 microns equivalent spherical diameter and not more than 15% by weight of particles smaller than 1 micron equivalent spherical diameter and wherein the aqueous suspension of said kaolin clay is dewatered by pressure filtration at a pressure greater than 250 pounds per square inch.

3. A method in accordance with claim 1, wherein the concentration of said water-soluble flocculant is in the range of from 500 to 2500 parts by weight per million parts by weight of clay.

* * * * *